US011288276B2

(12) United States Patent
Guiney (10) Patent No.: US 11,288,276 B2
(45) Date of Patent: Mar. 29, 2022

(54) METHOD, SYSTEM, AND COMPUTER PROGRAM PRODUCT FOR IDENTIFYING AND RESOLVING CONSTRAINT VIOLATIONS IN A DATABASE REPLICATION SYSTEM

(71) Applicant: Visa International Service Association, San Francisco, CA (US)

(72) Inventor: Brendan Joseph Guiney, Belfast (GB)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/844,003

(22) Filed: Apr. 9, 2020

(65) Prior Publication Data

US 2021/0319030 A1 Oct. 14, 2021

(51) Int. Cl.
*G06F 16/2455* (2019.01)
*G06Q 20/40* (2012.01)
*G06F 16/22* (2019.01)
*G06F 16/27* (2019.01)

(52) U.S. Cl.
CPC .... *G06F 16/24565* (2019.01); *G06F 16/2282* (2019.01); *G06F 16/27* (2019.01); *G06Q 20/40* (2013.01)

(58) Field of Classification Search
USPC .......................................................... 707/702
See application file for complete search history.

(56) References Cited

U.S. PATENT DOCUMENTS

| 10,216,820 | B1 * | 2/2019 | Holenstein ......... G06F 16/1865 |
| 2010/0241637 | A1 * | 9/2010 | Kissner ............ G06F 16/24565 |
| | | | 707/752 |
| 2015/0293980 | A1 * | 10/2015 | Dola .................... G06F 16/137 |
| | | | 726/26 |
| 2017/0154351 | A1 * | 6/2017 | Venugopalan ......... G06Q 20/36 |

FOREIGN PATENT DOCUMENTS

CN 103455570 A 12/2018

\* cited by examiner

*Primary Examiner* — Muluemebet Gurmu
(74) *Attorney, Agent, or Firm* — The Webb Law Firm (57) ABSTRACT

A method, system, and computer program product for identifying and resolving constraint violations in a database replication system determine a predetermined type of constraint violation and, in response thereto, write a record that failed to replicate into an error table on a target database and create a trigger on the error table to automatically and immediately handle the error record, based on why the record failed to replicate.

20 Claims, 6 Drawing Sheets

METHOD, SYSTEM, AND COMPUTER PROGRAM PRODUCT FOR IDENTIFYING AND RESOLVING CONSTRAINT VIOLATIONS IN A DATABASE REPLICATION SYSTEM

BACKGROUND

1. Field

This disclosure relates generally to systems, devices, products, apparatus, and methods that are data replication, and in some embodiments or aspects, to a method, a system, and a product for identifying and resolving constraint violations in a database replication system.

2. Technical Considerations

A database replication system (e.g., a system using Oracle GoldenGate software, etc.) may attempt to maintain data integrity across databases in different data centers, where applications are running in an active-active mode in which two or more nodes are simultaneously processing transactions for the same application. However, data can fail to replicate across the different data centers due to constraint violations. A common way to handle such constraint violations is to silence the failures in order to ensure data replication does not stop. However, such a solution may result in missing or incorrect data across the databases. Accordingly, there is a need in the art for improved identification and resolution of constraint violations in a database replication system.

SUMMARY

Accordingly, provided are improved systems, devices, products, apparatus, and/or methods for identifying and resolving constraint violations in a database replication system.

According to some non-limiting embodiments or aspects, provided is a computer-implemented method for identifying and resolving constraint violations in a database replication system, the database replication system including a source database and a target database, each database having one or more tables, including: detecting a database change that causes a constraint violation as a result of a target database table having one or more constraints; determining whether a type of the constraint violation is a predetermined type of constraint violation; in response to determining that the type of the constraint violation is the predetermined type of constraint violation, writing the database change to an error table; in response to writing the database change to the error table, automatically and immediately writing the database change to a master replication errors table as an error record and determining whether the predetermined type of constraint violation is associated with a predetermined type of unique identifier; in response to determining that the predetermined type of constraint violation is associated with the predetermined type of unique identifier, locking a main record associated with the predetermined type of constraint violation in the target database table and comparing the error record to the main record in the target database table to determine whether the error record is a latest record of the error record and the main record; and in response to determining that the error record is the latest record, updating the target database table with the error record.

In some non-limiting embodiments or aspects, the predetermined type of constraint violation includes a unique key violation.

In some non-limiting embodiments or aspects, the predetermined type of unique identifier includes an account identifier.

In some non-limiting embodiments or aspects, the account identifier includes a primary account number (PAN).

In some non-limiting embodiments or aspects, the predetermined type of unique identifier includes at least one of a unique payment instrument identifier and a unique customer identifier.

In some non-limiting embodiments or aspects, the method further includes: in response to determining that the error record is the latest record, updating one or more other database tables that are dependent on the database table with the error record.

In some non-limiting embodiments or aspects, the method further includes: replicating changes made at the source database to the target database by immediately applying the changes to the target database that do not cause a constraint violation.

According to some non-limiting embodiments or aspects, provided is a database replication system for identifying and resolving constraint violations, including: a source database and a target database, each database having one or more tables; and one or more processors programmed and/or configured to: detect a database change that causes a constraint violation as a result of a target database table having one or more constraints; determine whether a type of the constraint violation is a predetermined type of constraint violation; in response to determining that the type of the constraint violation is the predetermined type of constraint violation, write the database change to an error table; in response to writing the database change to the error table, automatically and immediately write the database change to a master replication errors table as an error record and determine whether the predetermined type of constraint violation is associated with a predetermined type of unique identifier; in response to determining that the predetermined type of constraint violation is associated with the predetermined type of unique identifier, lock a main record associated with the predetermined type of constraint violation in the target database and compare the error record to the main record in the target database table to determine whether the error record is a latest record of the error record and the main record; and in response to determining that the error record is the latest record, update the target database table with the error record.

In some non-limiting embodiments or aspects, the predetermined type of constraint violation includes a unique key violation.

In some non-limiting embodiments or aspects, the predetermined type of unique identifier includes an account identifier.

In some non-limiting embodiments or aspects, the account identifier includes a primary account number (PAN).

In some non-limiting embodiments or aspects, the predetermined type of unique identifier includes at least one of a unique payment instrument identifier and a unique customer identifier.

In some non-limiting embodiments or aspects, the one or more processors are further programmed and/or configured to: in response to determining that the error record is the latest record, update one or more other database tables that are dependent on the database table with the error record.

In some non-limiting embodiments or aspects, the one or more processors are further programmed and/or configured to: replicate changes made at the source database to the target database by immediately applying the changes to the target database that do not cause a constraint violation.

According to some non-limiting embodiments or aspects, provided is a computer program product for identifying and resolving constraint violations in a database replication system, the database replication system including a source database and a target database, each database having one or more tables, the computer program product including at least one non-transitory computer-readable medium including program instructions that, when executed by at least one processor, cause the at least one processor to: detect a database change that causes a constraint violation as a result of a target database table having one or more constraints; determine whether a type of the constraint violation is a predetermined type of constraint violation; in response to determining that the type of the constraint violation is the predetermined type of constraint violation, write the database change to an error table; in response to writing the database change to the error table, automatically and immediately write the database change to a master replication errors table as an error record and determine whether the predetermined type of constraint violation is associated with a predetermined type of unique identifier; in response to determining that the predetermined type of constraint violation is associated with the predetermined type of unique identifier, lock a main record associated with the predetermined type of constraint violation in the target database table and compare the error record to the main record in the target database table to determine whether the error record is a latest record of the error record and the main record; and in response to determining that the error record is the latest record, update the target database table with the error record.

In some non-limiting embodiments or aspects, the predetermined type of constraint violation includes a unique key violation.

In some non-limiting embodiments or aspects, the predetermined type of unique identifier includes an account identifier.

In some non-limiting embodiments or aspects, the account identifier includes a primary account number (PAN).

In some non-limiting embodiments or aspects, the one or more processors are further programmed and/or configured to: in response to determining that the error record is the latest record, update one or more other database tables that are dependent on the database table with the error record.

In some non-limiting embodiments or aspects, the one or more processors are further programmed and/or configured to: replicate changes made at the source database to the target database by immediately applying the changes to the target database that do not cause a constraint violation.

Further embodiments or aspects are set forth in the following numbered clauses:

Clause 1. A computer-implemented method for identifying and resolving constraint violations in a database replication system, the database replication system including a source database and a target database, each database having one or more tables, comprising: detecting a database change that causes a constraint violation as a result of a target database table having one or more constraints; determining whether a type of the constraint violation is a predetermined type of constraint violation; in response to determining that the type of the constraint violation is the predetermined type of constraint violation, writing the database change to an error table; in response to writing the database change to the error table, automatically and immediately writing the database change to a master replication errors table as an error record and determining whether the predetermined type of constraint violation is associated with a predetermined type of unique identifier; in response to determining that the predetermined type of constraint violation is associated with the predetermined type of unique identifier, locking a main record associated with the predetermined type of constraint violation in the target database table and comparing the error record to the main record in the target database table to determine whether the error record is a latest record of the error record and the main record; and in response to determining that the error record is the latest record, updating the target database table with the error record.

Clause 2. The computer-implemented method of clause 1, wherein the predetermined type of constraint violation includes a unique key violation.

Clause 3. The computer-implemented method of any of clauses 1 or 2, wherein the predetermined type of unique identifier includes an account identifier.

Clause 4. The computer-implemented method of any of clauses 1-3, wherein the account identifier includes a primary account number (PAN).

Clause 5. The computer-implemented method of any of clauses 1-4, wherein the predetermined type of unique identifier includes at least one of a unique payment instrument identifier and a unique customer identifier.

Clause 6. The computer-implemented method of any of clauses 1-5, further comprising: in response to determining that the error record is the latest record, updating one or more other database tables that are dependent on the database table with the error record.

Clause 7. The computer-implemented method of any of clauses 1-6, further comprising: replicating changes made at the source database to the target database by immediately applying the changes to the target database that do not cause a constraint violation.

Clause 8. A database replication system for identifying and resolving constraint violations, comprising: a source database and a target database, each database having one or more tables; and one or more processors programmed and/or configured to: detect a database change that causes a constraint violation as a result of a target database table having one or more constraints; determine whether a type of the constraint violation is a predetermined type of constraint violation; in response to determining that the type of the constraint violation is the predetermined type of constraint violation, write the database change to an error table; in response to writing the database change to the error table, automatically and immediately write the database change to a master replication errors table as an error record and determine whether the predetermined type of constraint violation is associated with a predetermined type of unique identifier; in response to determining that the predetermined type of constraint violation is associated with the predetermined type of unique identifier, lock a main record associated with the predetermined type of constraint violation in the target database and compare the error record to the main record in the target database table to determine whether the error record is a latest record of the error record and the main record; and in response to determining that the error record is the latest record, update the target database table with the error record.

Clause 9. The database replication system of clause 8, wherein the predetermined type of constraint violation includes a unique key violation.

Clause 10. The database replication system of any of clauses 8 or 9, wherein the predetermined type of unique identifier includes an account identifier.

Clause 11. The database replication system of any of clauses 8-10, wherein the account identifier includes a primary account number (PAN).

Clause 12. The database replication system of any of clauses 8-11, wherein the predetermined type of unique identifier includes at least one of a unique payment instrument identifier and a unique customer identifier.

Clause 13. The database replication system of any of clauses 8-12, wherein the one or more processors are further programmed and/or configured to: in response to determining that the error record is the latest record, update one or more other database tables that are dependent on the database table with the error record.

Clause 14. The database replication system of any of clauses 8-13, wherein the one or more processors are further programmed and/or configured to: replicate changes made at the source database to the target database by immediately applying the changes to the target database that do not cause a constraint violation.

Clause 15. A computer program product for identifying and resolving constraint violations in a database replication system, the database replication system including a source database and a target database, each database having one or more tables, the computer program product comprising at least one non-transitory computer-readable medium including program instructions that, when executed by at least one processor, cause the at least one processor to: detect a database change that causes a constraint violation as a result of a target database table having one or more constraints; determine whether a type of the constraint violation is a predetermined type of constraint violation; in response to determining that the type of the constraint violation is the predetermined type of constraint violation, write the database change to an error table; in response to writing the database change to the error table, automatically and immediately write the database change to a master replication errors table as an error record and determine whether the predetermined type of constraint violation is associated with a predetermined type of unique identifier; in response to determining that the predetermined type of constraint violation is associated with the predetermined type of unique identifier, lock a main record associated with the predetermined type of constraint violation in the target database table and compare the error record to the main record in the target database table to determine whether the error record is a latest record of the error record and the main record; and in response to determining that the error record is the latest record, update the target database table with the error record.

Clause 16. The computer program product of clause 15, wherein the predetermined type of constraint violation includes a unique key violation.

Clause 17. The computer program product of any of clauses 15 or 16, wherein the predetermined type of unique identifier includes an account identifier.

Clause 18. The computer program product of any of clauses 15-17, wherein the account identifier includes a primary account number (PAN).

Clause 19. The computer program product of any of clauses 15-18, wherein the one or more processors are further programmed and/or configured to: in response to determining that the error record is the latest record, update one or more other database tables that are dependent on the database table with the error record.

Clause 20. The computer program product of any of clauses 15-19, wherein the one or more processors are further programmed and/or configured to: replicate changes made at the source database to the target database by immediately applying the changes to the target database that do not cause a constraint violation.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives payment transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a payment transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting payment transactions, such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "acquirer" may refer to an entity licensed by the transaction service provider and/or approved by the transaction service provider to originate payment transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The payment transactions may include original credit transactions (OCTs) and account funding transactions (AFTs). The acquirer may be authorized by the transaction service provider to sign merchants of service providers to originate payment transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

A software application may depend on one or more databases of information that the application maintains to record a current state of the application. For example, a software application may receive requests to process payment transactions and, as part of the processing of a request, the software application may make certain modifications to the one or more databases. For example, the software application may insert rows, update rows, and delete rows in a database. The software application may read the contents of rows in a database. The software application may read certain information from its database to make decisions. Based on the request the software application received from an incoming end user and the data in the database, the application may deliver certain services to other systems or users, such as authorization or denial of a payment transaction, and/or the like.

Changes to the database (e.g., inserts, updates, deletes, changes to the database structure, etc.) may be organized as transactions. A transaction may include a delimited set of changes that either must all be made to a database or sent to an application, or else none are. For example, transactions typically exhibit ACID properties: Atomicity, Consistency, Isolation, and Durability.

The changes comprising a transaction may be delimited by a pair of directives. The beginning of a transaction may be identified by a Begin Transaction directive (in some systems, the Begin Transaction directive is implied by the first operation of a new transaction). The conclusion of a transaction may be either a Commit Transaction directive or an Abort or Abend Transaction directive. A Commit Transaction directive causes all of the changes within the transaction to be applied to the database and to be durable. An Abort Transaction directive causes the changes within the transaction to be discarded. A transaction may span and modify several resources. The most common resource is a disk volume or data center, though there may be other resources such as a synchronous replication engine. A database may be spread across several disk volumes, each a separate resource. Before a transaction can be committed, all resources must agree that they have received all of their changes and that they have safe-stored them or applied them to their portions of the database. If all resources can commit their changes, the transaction is committed; and the changes are made to the resources. If any resource cannot commit its changes, the transaction is aborted; and no changes are made to the database. This ensures the attribute of atomicity-either all changes within the bounds of the transaction are applied to the database, or none are.

Figure 4:
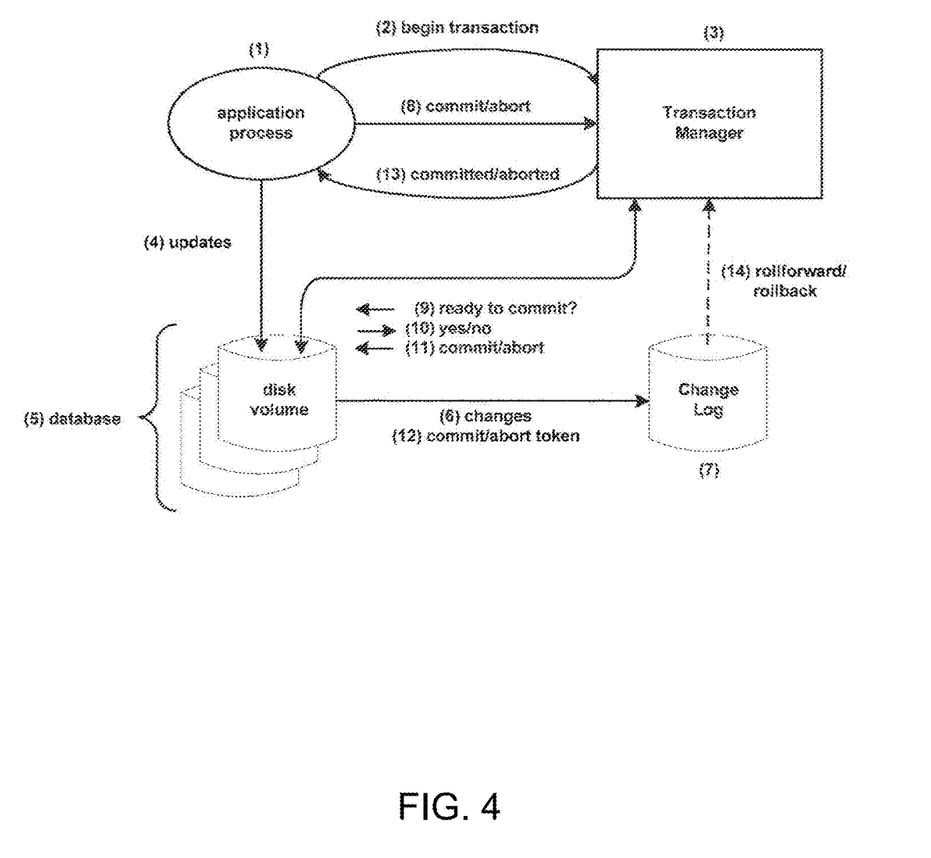
FIG. 4 is a block diagram showing an example of transaction processing by a transaction manager.

Referring now to FIG. 4, coordinating the commit of a transaction may be the job of a Transaction Manager. When an application (1) wishes to begin a transaction, it makes a request (2) to the Transaction Manager (3). The application then applies the changes (4) bounded by the transaction to its application database (5). As each change is made, its before and/or after images are written (6) to a Change Log (7).

When the application has completed the database changes for the transaction, it sends a commit request (8) to the Transaction Manager. The Transaction Manager next asks each resource involved in the transaction (typically, the disk volumes that had been involved in the transaction) if it is ready to commit (9). If all resources respond positively (10), the Transaction Manager instructs them to commit the transaction (11). It will write a commit token to the Change Log (12) and will inform the application that the transaction has been committed (13).

If any resource responds that it cannot make the changes to its database (10), the Transaction Manager informs all databases and resources to abort the transaction (11). No changes will be made to the databases, and all locks will be released. An abort token typically is written to the Change Log (12), and the application is informed that its transaction has been aborted (13). The application can also request that the Transaction Manager abort the transaction (8) rather than ask the Transaction Manager to commit the transaction.

The Transaction Manager typically uses the Change Log (7) to correct corruption to the database. It uses the before images stored with each change to roll back data objects to their original values if they have been erroneously changed. It uses the after images in the Change Log to roll forward data objects whose changes have become lost due to a system malfunction (14).

Many applications share data between two or more systems or environments that may be on the same or different systems. Data sharing can be accomplished using data replication. A data replication engine accesses data changes generated by a source system or environment and transfers the changes to a target system or environment. The target system or environment applies the changes to the target database to keep the source database and the target database synchronized.

Database changes are typically made available to the replication engine via the change log, which may contain each of the database changes and the commit/abort tokens made by the various source applications. The replication engine follows the changes recorded in the change log and replicates them to the target system.

Figure 5:
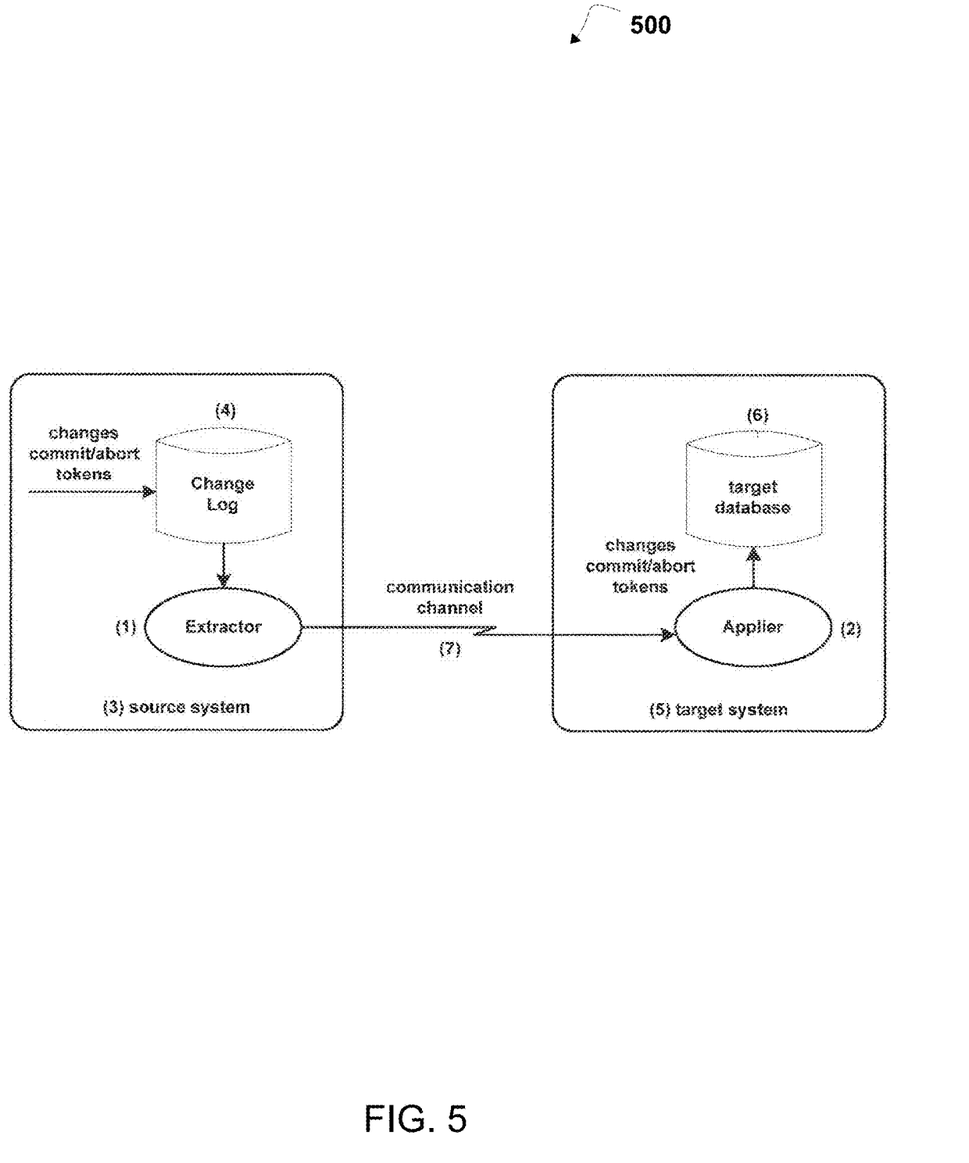
FIG. 5 is a block diagram of a data replication engine.

Referring now to FIG. 5, a data replication engine may include an Extractor (1) and an Applier (2). The Extractor may be collocated on the source system (3) with the Change Log (4). The Applier may be resident on the target system (5) with the target database (6). It is the job of the Extractor to follow the Change Log and to read the changes as they are entered into the change queue. The Extractor sends each change (or blocks of changes to improve communication-line utilization) over a communication channel (7) to the Applier, which applies the changes to the target database.

In some non-limiting embodiments or aspects, the replication engine may be provided by Oracle's GoldenGate software, which provides for asynchronous replication. For example, when asynchronous replication is used, the target system initiates a transaction that is independent from that on the source system. When the source system requests that its Transaction Manager start a transaction, the Transaction Manager may insert a begin-transaction token into the Change Log. When the target system reads the begin-transaction token, it initiates an independent transaction via a target-side Transaction Manager. Alternatively, there may be no begin-transaction token; and the initiation of a new transaction is implied by the first transaction operation received by the target system. As database changes are received by the target system, they are applied to the target database under their respective target-side transactions. Alternatively, the target system may safe-store the changes to durable storage without applying them to the database with the intent of holding them for eventual replay and an eventual commit operation. When the source system commits or aborts a transaction, the source Transaction Manager will write a commit token or an abort token to the Change Log. This token will propagate to the target system via the replication engine and will cause the target-side Transaction Manager to commit or abort the target-side transaction. With asynchronous replication, the transfer of data from the source system to the target system is undertaken independently of the source-system processing. The source system is not aware that data replication is taking place, as data to be replicated is read from the Change Log after the source system has recorded it. There is a delay from when data or tokens are entered into the Change Log at the source system and when they are applied to the target database. This delay is known as replication latency.

Many databases are managed by a Database Management System (DBMS), such as provided by Oracle. The databases may be comprised of files, of tables, or of both. Often, the databases are relational databases. Relational databases are organized by keys (also called indices). A DBMS can be asked to insert, update, delete, or retrieve selective data from the database according to a key specification (such as a SQL SELECT).

Each row in a table is identified by a unique primary key. The row can be accessed directly by specifying the value of its primary key. An example of a primary key may be a unique account identifier, such as a PAN, a payment instrument level identifier, a customer level identifier, and/or the like. For example, if a PAN is specified to the DBMS, it will return the row for that account. In addition, each row or record may by indexed by one or more alternate keys. An alternate key can be used to access multiple records with the same alternate key. An example of an alternate key is a zip code. If a zip code is specified to the DBMS, it will return all rows that carry that zip code.

To maintain the integrity of the database, the DBMS will often enforce certain constraints on the contents of rows and their keys as rows are inserted, updated, or deleted. These constraints are known as relational constraints. If a change to the database violates a relational constraint, the change will be rejected as an error. Examples of relational constraints may include a unique key constraint (e.g., for a primary key, for an alternate key, etc.), a referential integrity constraint, a constraint defined to validate the requirement that a field is always a positive number or that at least one line item be a child row to an invoice header row, and/or the like. If one of these constraints is violated, the change or the transaction may be rejected.

In some non-limiting embodiments or aspects, a request to a Transaction Manager may include a configuration flag that directs or routes the request to a particular data center (e.g., the source system, the target system, etc.). For example, a merchant configuration flag may align a merchant to a particular data center to ensure that each of the requests from that merchant are processed in that single data center or database (e.g., a data center affinity flag, etc.). As an example, this attribute may be provided in the header of each request from the merchant to the Transaction Manger, which enables the traffic to be diverted to the data center identified by the flag. In such a scenario, the local constraints and locking within that database should handle any simultaneous request submitted by that merchant.

Figure 6:
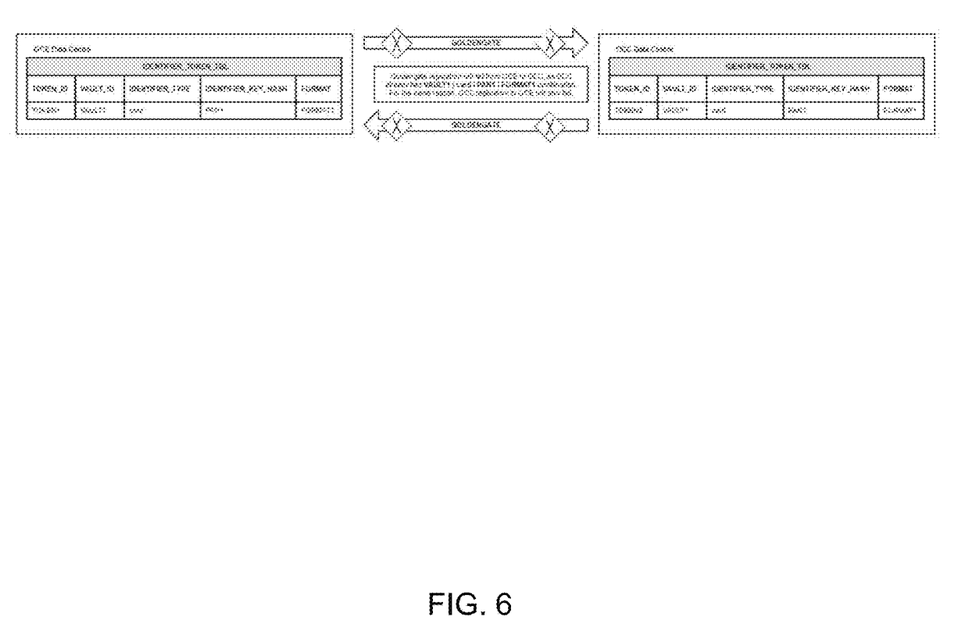
FIG. 6 shows an example of a unique key violation in a source database and a target database.

Ideally, and in theory, this data center affinity flag should be sufficient to control a merchant's data integrity. Unfortunately, there are two scenarios where this configuration may not work. Referring now to FIG. 6, in a first scenario, a data center affinity (e.g., for x-datacenter, etc.) may not be set in the header correctly in an API call to the Transaction Manager. For example, a payment gateway Enterprise Business Center (EBC) may send a request to the Transaction Manager in which the data center affinity flag is incorrect for the merchant associated with the request. This may result in the merchant and/or the payment gateway attempting to tokenize the same unique identifier (e.g., the same PAN, etc.) multiple times in quick succession, and each call may potentially be directed to a different data center, thereby resulting in two duplicate identifier tokens being created. Such a scenario may cause Oracle's GoldenGate to abend, since it will violate the VAULT_ID | DENTIFIER_TYPE | IDENTIFIER_KEY_HASH|FORMAT. However, GoldenGate is typically configured to ignore unique key violations, which prevents GoldenGate from abending. However, this does not address the problem of the duplicate identifier tokens, it simply allows a silent failure. In a second scenario, if a merchant and/or payment gateway executes two quick calls to the Transaction Manager for the same unique identifier (e.g., the same PAN, etc.), and in between each call being processed a traffic switch occurs, the two requests may be sent to different data centers, which results in the same problem as experienced in the first scenario.

Non-limiting embodiments or aspects of the present disclosure are directed to systems, methods, and computer program products for identifying and resolving constraint violations in a database replication system, the database replication system including a source database and a target database, each database having one or more tables, that detect a database change that causes a constraint violation as a result of a target database table having one or more constraints; determine whether a type of the constraint violation is a predetermined type of constraint violation; in response to determining that the type of the constraint violation is the predetermined type of constraint violation, write the database change to an error table; in response to writing the database change to the error table, automatically and immediately write the database change to a master replication errors table as an error record and determine whether the predetermined type of constraint violation is associated with a predetermined type of unique identifier; in response to determining that the predetermined type of constraint violation is associated with the predetermined type of unique identifier, lock a main record associated with the predetermined type of constraint violation in the target database table and compare the error record to the main record in the target database table to determine whether the error record is a latest record of the error record and the main record; and in response to determining that the error record is the latest record, update the target database table with the error record. In this way, non-limiting embodiments or aspects of the present disclosure provide for the identifier token record in the main table to be updated with all of the error records details, which guarantees that both data centers have the same record in place due to the logic taking place in both data centers and due to the logic of keeping the latest record only, within a single autonomous transaction (e.g., from the moment that the replication engine attempts to write the duplicate identifier token record to the moment it fails over to the error table and the trigger executes its logic is a single transaction within the database that is completely synchronous).

Figure 1:
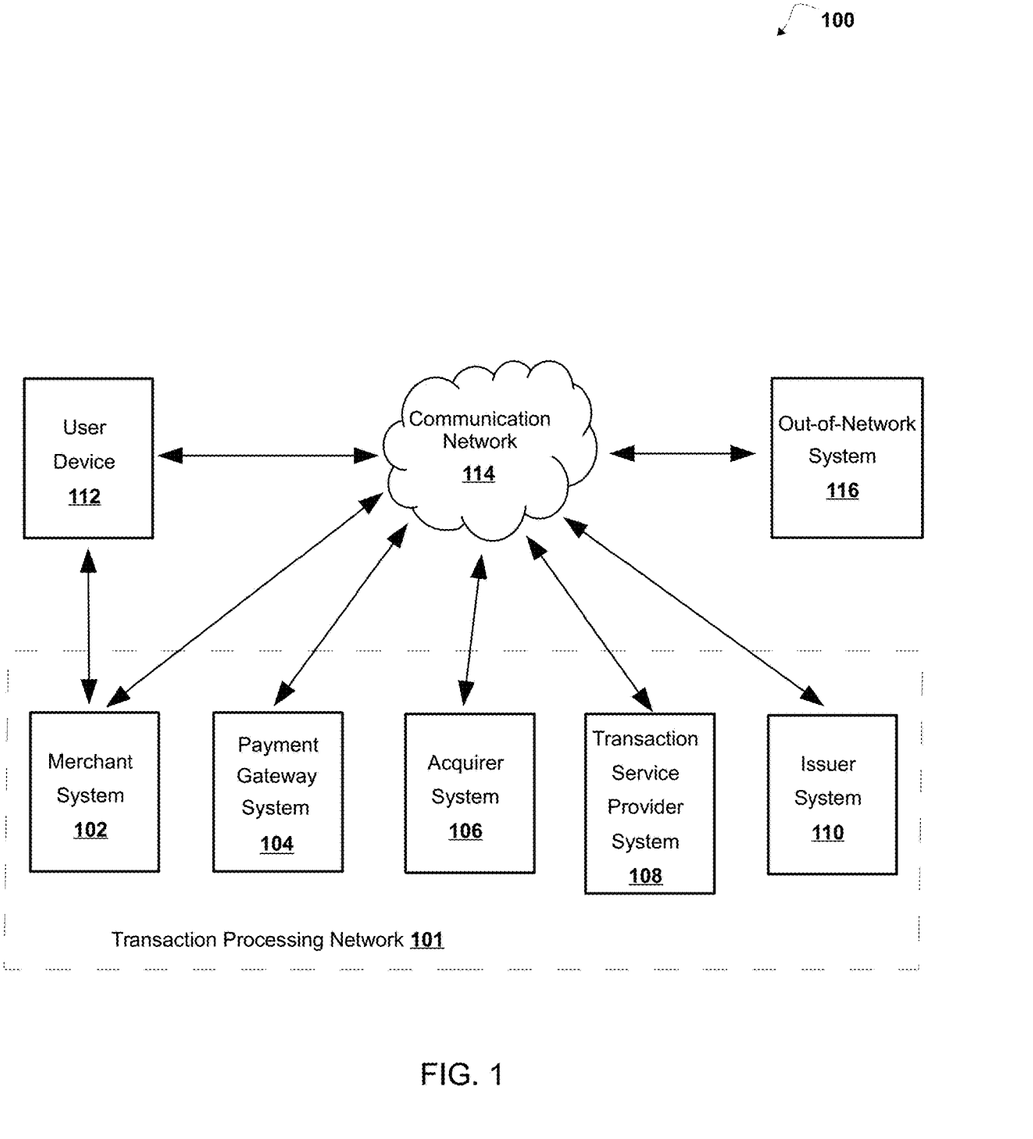
FIG. 1 is a diagram of non-limiting embodiments or aspects of an environment in which systems, devices, products, apparatus, and/or methods, described herein, may be implemented.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, and/or issuer system 110, user device 112, communication network 114, and/or out-of-network system 116. Transaction processing network 101, merchant system 102, payment gateway system 104, acquirer system 106, transaction service provider system 108, issuer system 110, user device 112, and/or out-of-network system 116 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, user device 112, and/or out-of-network system 116 (e.g., via communication network 114, etc.) and/or communicating information and/or data to payment gateway system 104, acquirer system 106, transaction service provider system 108, issuer system 110, user device 112, and/or out-of-network system 116 (e.g., via communication network 114, etc.). Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, user device 112, and/or out-of-network system 116 (e.g., via communication network 114, etc.) and/or communicating information and/or data to merchant system 102, acquirer system 106, transaction service provider system 108, issuer system 110, user device 112, and/or out-of-network system 116 (e.g., via communication network 114, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, user device 112, and/or out-of-network system 116 (e.g., via communication network 114, etc.) and/or communicating information and/or data to merchant system 102, payment gateway system 104, transaction service provider system 108, issuer system 110, and/or user device 112 (e.g., via communication network 114, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, user device 112, and/or out-of-network system 116 (e.g., via communication network 114, etc.) and/or communicating information and/or data to merchant system 102, payment gateway system 104, acquirer system 106, issuer system 110, user device 112, and/or out-of-network system 116 (e.g., via communication network 114, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including transaction data, and/or the like.

Issuer system 110 may include one or more devices capable of receiving information and/or data from merchant system 102, payment gateway system 104, acquirer system 106, transaction service provider system 108, user device 112, and/or out-of-network system 116 (e.g., via communication network 114, etc.) and/or communicating information and/or data to merchant system 102, payment gateway system 104, acquirer system 106, transaction service provider system 108, user device 112, and/or out-of-network system 116 (e.g., via communication network 114, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, issuer system 110, and/or out-of-network system 116 (e.g., via communication network 114, etc.) and/or communicating information and/or data to merchant system 102, payment gateway system 104, acquirer system 106, transaction service provider system 108, issuer system 110, and/or out-of-network system 116 (e.g., via communication network 114, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, a peer-to-peer payment transfer application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Out-of-network system 116 may include one or more devices capable of receiving information and/or data from merchant system 102, payment gateway system 104, acquirer system 106, transaction service provider system 108, issuer system 110, and/or user device 112 (e.g., via communication network 114, etc.) and/or communicating information and/or data to merchant system 102, payment gateway system 104, acquirer system 106, transaction service provider system 108, issuer system 110, and/or user device 112 (e.g., via communication network 114, etc.). For example, out-of-network system 116 may include a computing device, such as a server, a group of servers, and/or other like devices. In some non-limiting embodiments or aspects, out-of-network system 116 is located outside transaction processing network 101. For example, out-of-network system 116 may be located outside a communication path for processing a transaction in transaction processing network 101. As an example, out-of-network system 116 may be associated with one or more electronic payment transactions processed (e.g., initiated, conducted, authorized, etc.) via a communication path (e.g., a communication path, a communication channel, a communication network, etc.) for processing an electronic payment transaction other than the communication path between or including merchant system 102, payment gateway system 104, acquirer system 106, transaction service provider system 108, and/or issuer system 110. In some non-limiting embodiments or aspects, out-of-network system 116 may be associated with an issuer institution as described herein. For example, out-of-network system 116 may be associated with an issuer institution that issued a payment account or instrument (e.g., a credit account, a debit account, a credit card, a debit card, etc.) to a user (e.g., a user associated with user device 112, etc.). In some non-limiting embodiments or aspects, out-of-network system 116 may be associated with a merchant as described herein. In some non-limiting embodiments or aspects, out-of-network system 116 may include one or more devices, such as computers, computer systems, and/or peripheral devices capable of being used by a merchant to conduct a payment transaction with a user. For example, out-of-network system 116 may include a POS device and/or a POS system.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally, or alternatively, a set of devices and/or systems (e.g., one or more devices or systems) of environment 100 may perform one or more functions described as being performed by another set of devices or systems of environment 100.

Figure 2:
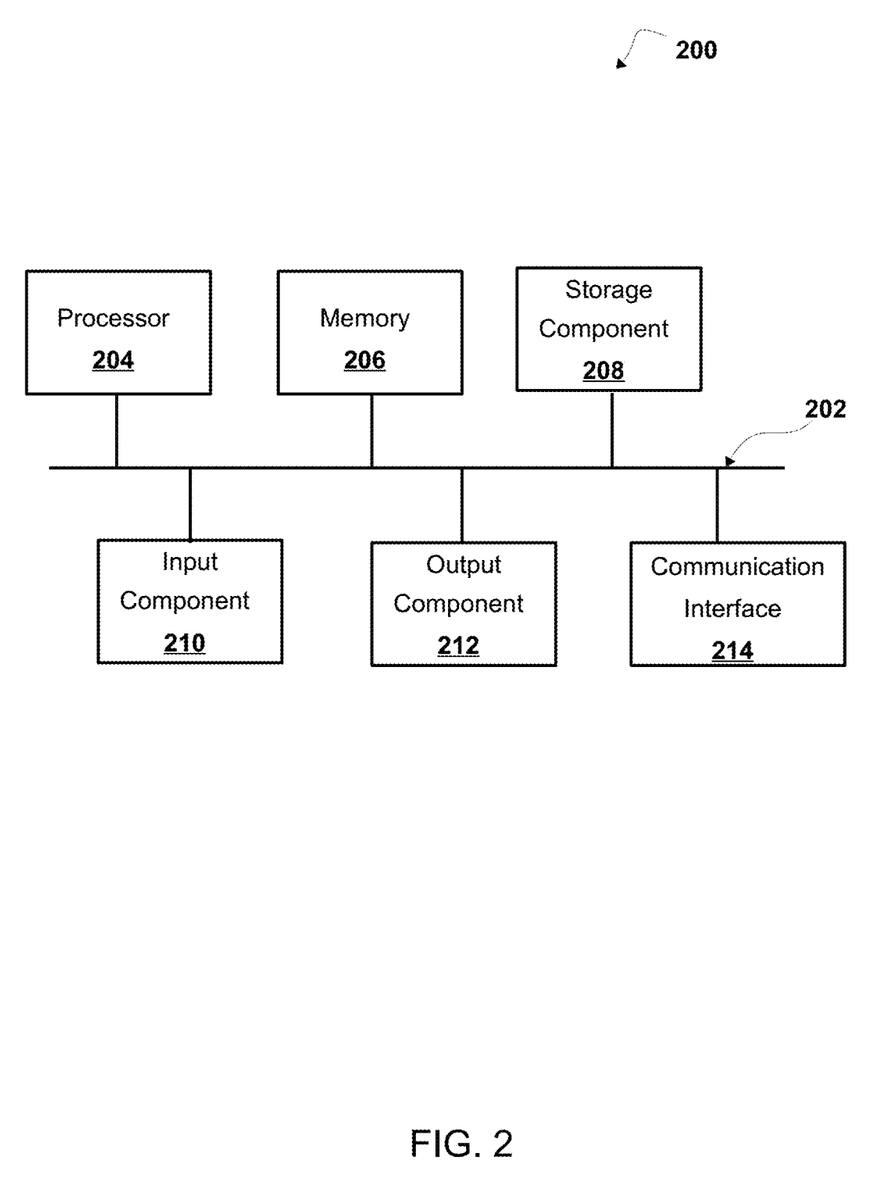
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114. In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with payment transactions processed and/or being processed in transaction processing network 101 (e.g., prior or historical transactions processed via transaction service provider system 108, etc.) and/or outside of transaction processing network 101, and/or the like.

In some non-limiting embodiments or aspects, transaction data may include parameters associated with a transaction, such as an account identifier (e.g., a PAN, a unique payment instrument identifier, a unique customer identifier, etc.), a transaction amount, a transaction date and/or time, a type of products and/or services associated with the transaction, a conversion rate of currency, a type of currency, a merchant type, a merchant name, a merchant location, a merchant, a merchant category group (MCG), a merchant category code (MCC), an AA score, a card acceptor identifier, a card acceptor country/state/region, and/or the like. In such an example, MCGs may include general categories under which merchant category codes fall, such as Travel, Lodging, Dining and Entertainment, Vehicle Expenses, Office Services and Merchandise, Cash Advance, Other, and/or the like. In such an example, an MCC is a four-digit number listed in ISO 18245 for retail financial services used to classify a business by the types of goods or services it provides.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
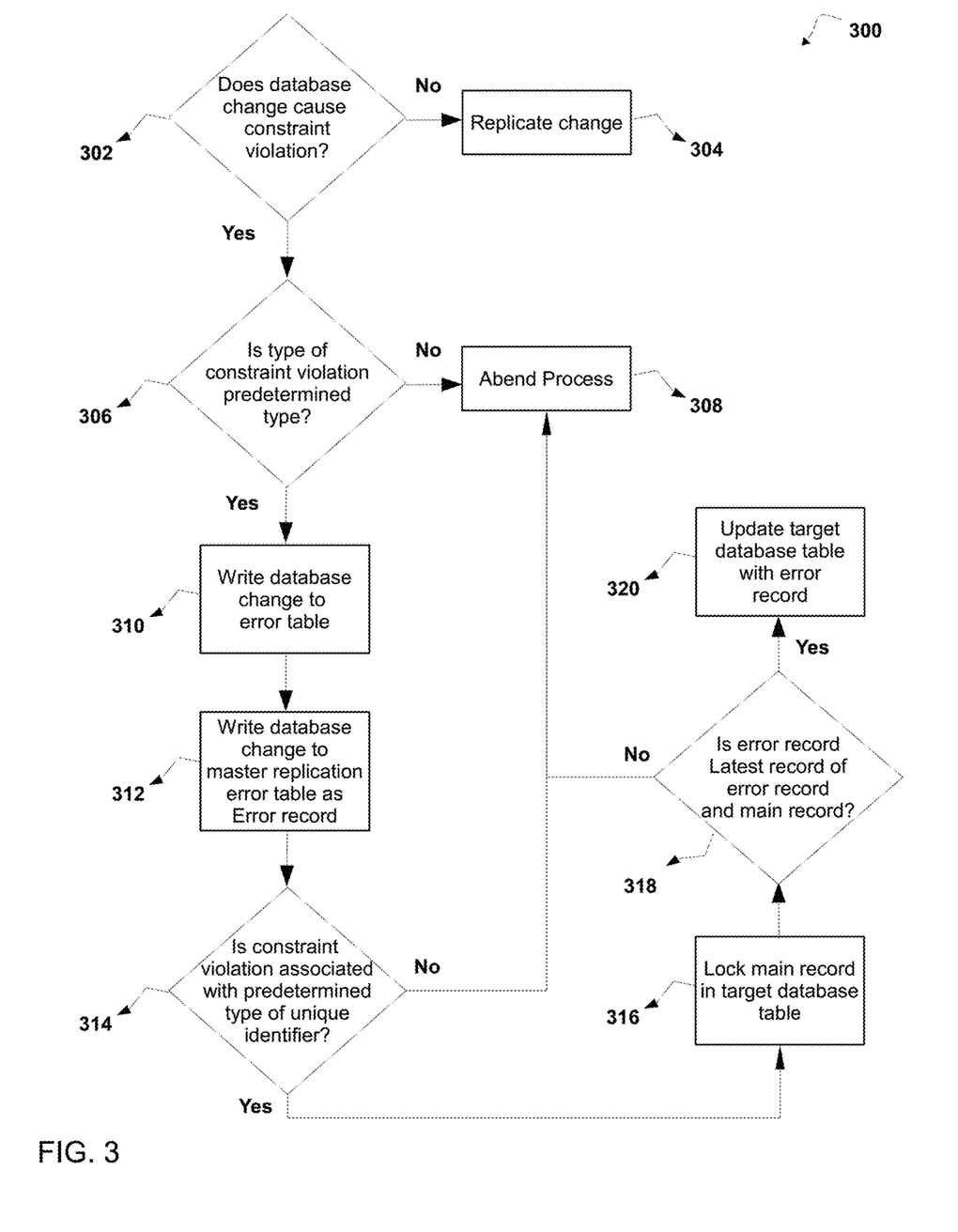
FIG. 3 is a flowchart of non-limiting embodiments or aspects of a process for identifying and resolving constraint violations in a database replication system.

Referring now to FIG. 3, FIG. 3 is a flowchart of non-limiting embodiments or aspects of a process 300 for identifying and resolving constraint violations in a database replication system. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes determining if a database change causes a constraint violation as a result of a target database having one or more constraints. For example, a data replication engine (e.g., implemented by transaction service provider system 108, etc.) may determine if a database change causes a constraint violation as a result of a target database having one or more constraints. In such an example, the data replication engine may be included in a database replication system, the database replication system including a source database and a target database, each database having one or more tables. For example, a MACRO stub may be added within an Oracle GoldenGate configuration file for the data replication engine to handle or flag specific error codes experienced while persisting the replicated record to the target database.

As shown in FIG. 3, at step 304 (e.g., "NO" at step 302), process 300 includes, in response to determining that a database change does not cause a constraint violation as a result of a target database having one or more constraints, replicating the database change made at the source database to the target database. For example, the data replication engine (e.g., implemented by transaction service provider system 108, etc.) may, in response to determining that the database change does not cause a constraint violation as a result of the target database having one or more constraints, replicate the database change made at the source database to the target database. As an example, the data replication engine may replicate changes made at the source database to the target database by immediately applying the changes to the target database that do not cause a constraint violation.

As shown in FIG. 3, at step 306 (e.g., "YES" at step 302), process 300 includes, in response to determining that a database change causes a constraint violation as a result of a target database having one or more constraints, determining whether a type of the constraint violation is a predetermined type of constraint violation. For example, the data replication engine (e.g., implemented by transaction service provider system 108, etc.) may, in response to determining that a database change causes a constraint violation as a result of a target database having one or more constraints, determine whether a type of the constraint violation is a predetermined type of constraint violation. As an example, the MACRO stub added within the Oracle GoldenGate configuration file for the data replication engine may handle or flag only specific error codes (e.g., only an error code associated with the predetermined type of constraint violation, etc.).

In some non-limiting embodiments or aspects, the predetermined type of constraint violation may include a unique key violation. For example, a constraint violation may require a primary key to be unique within a table since the primary identifies a particular row in a table. If an attempt is made to insert a row with a primary key that is already in use, the insert may be rejected as a constraint violation. Likewise, if an attempt is made to modify a row in order to change its primary key, but the new primary key already exists, the change may result in a constraint violation.

As shown in FIG. 3, at step 308 (e.g., "NO" at step 306), process 300 includes, in response to determining that the type of the constraint violation is not the predetermined type of constraint violation, abending the data replication process. For example, the data replication engine (e.g., implemented by transaction service provider system 108, etc.) may, in response to determining that the type of the constraint violation is not the predetermined type of constraint violation (e.g., not a unique key violation, a violation other than a unique key violation, etc.), abend the data replication process.

As shown in FIG. 3, at step 310 (e.g., "YES" at step 306), process 300 includes, in response to determining that the type of the constraint violation is the predetermined type of constraint violation, writing the database change to an error table. For example, the data replication engine (e.g., implemented by transaction service provider system 108, etc.) may, in response to determining that the type of the constraint violation is the predetermined type of constraint violation (e.g., is a unique key violation, etc.), write the database change to an error table. As an example, the MACRO stub added within the Oracle GoldenGate configuration file for the data replication engine may flush the full record that failed to replicate into the error table on the target database. In such an example, this error table may be identical to the target table, such that there is a full copy of the failed record persisted in the target database. For example, if replicating an Identifier Token should fail for a unique key violation (e.g., a "−1" error), the data replication engine may handle the error as described herein in more detail below, rather than ignore the error. If replicating fails for another reason, the data replication engine may ABEND for investigation as described with respect to step 308.

As shown in FIG. 3, at step 312, process 300 includes, in response to writing the database change to the error table, automatically and immediately writing the database change to a master replication errors table as an error record. For example, the data replication engine (e.g., implemented by transaction service provider system 108, etc.) may, in response to writing the database change to the error table, automatically and immediately write the database change to a master replication errors table (e.g., a central table that stores each failure for both the source database and the target database, etc.) as an error record. As an example, the error record or table may include a trigger that automatically and immediately causes the full record that failed to replicate to be written to a master replication errors table in response to the writing of the full record to the error table. In such an example, the trigger may be enabled to run for STREAM processes to ensure that the trigger fires for Oracle GoldenGate while performing the insert.

As shown in FIG. 3, at step 314, process 300 includes determining whether the predetermined type of constraint violation is associated with a predetermined type of unique identifier. For example, the data replication engine (e.g., implemented by transaction service provider system 108, etc.) may determine whether the predetermined type of constraint violation is associated with a predetermined type of unique identifier. As an example, the data replication engine may check which unique key has been violated, because only the failure for a duplicate predetermined type of unique identifier (e.g., a duplicate PAN, etc.) is handled. If the unique key violated is for example, the "IDENTIFIER_TOKEN_ID", the data replication engine does not handle that failure and the trigger raises an exception that forces the process to abend so that the failure can be investigated. Note that this is one of the reasons the master exception table exists, so that there is a record of this error occurring, as once the trigger raises the exception, the record is not be persisted to the Identifier Token error table.

In some non-limiting embodiments or aspects, the predetermined type of unique identifier includes an account identifier (e.g., a tokenized account identifier, etc.). For example, the account identifier may include a PAN (e.g., a tokenized PAN, etc.). In some non-limiting embodiments or aspects, the predetermined type of unique identifier includes at least one of a unique payment instrument identifier and a unique customer identifier (e.g., a tokenized unique payment instrument identifier, a tokenized unique customer identifier, etc.).

As shown in FIG. 3, process 300 includes, in response to determining that the predetermined type of constraint violation is not associated with the predetermined type of unique identifier, returning processing to step 308 (e.g., "NO" at step 314) and abending the data replication process. For example, the data replication engine (e.g., implemented by transaction service provider system 108, etc.) may in response to determining that the predetermined type of constraint violation is not associated with the predetermined type of unique identifier (e.g., is not associated with a PAN, etc.), abend the data replication process.

As shown in FIG. 3, at step 316 (e.g., "YES" at step 314), process 300 includes, in response to determining that the predetermined type of constraint violation is associated with the predetermined type of unique identifier, locking a main record associated with the predetermined type of constraint violation in the target database table. For example, the data replication engine (e.g., implemented by transaction service provider system 108, etc.) may, in response to determining that the predetermined type of constraint violation is associated with the predetermined type of unique identifier (e.g., is associated with a PAN, etc.), lock a main record associated with the predetermined type of constraint violation in the target database table.

As shown in FIG. 3, at step 318, process 300 includes comparing the error record to the main record in the target database table to determine whether the error record is a latest record of the error record and the main record. For example, the data replication engine (e.g., implemented by transaction service provider system 108, etc.) may compare the error record in the master replication errors table to the main record (e.g., the duplicate record) in the target database table to determine whether the error record is a latest record (e.g., received later in time, created later in time, etc.) of the error record and the main record.

As shown in FIG. 3, process 300 includes, in response to determining that the error record is not a latest record of the error record and the main record, returning processing to step 308 (e.g., "NO" at step 318) and abending the data replication process. For example, the data replication engine (e.g., implemented by transaction service provider system 108, etc.) may, in response to determining that the error record is not a latest record of the error record and the main record, abend the data replication process and/or take no action with respect to the replication failure.

As shown in FIG. 3, at step 320 (e.g., "YES" at step 318), process 300 includes, in response to determining that the error record is a latest record of the error record and the main record, updating the target database table with the error record. For example, the data replication engine (e.g., implemented by transaction service provider system 108, etc.) may, in response to determining that the error record is a latest record of the error record and the main record, update the target database table with the error record. As an example, the data replication engine may update the identifier token record in the main table with each of the error record details or contents including the token identifier included in the error record. In such an example, because there are other tables dependent on the "IDENTIFIER_TOKEN_TBL", the trigger may also cause the replication engine to update the records in those tables which are associated to that Identifier Token record (e.g., EXTERNAL_TOKEN_TBL, INSTRUMENT_TOKEN_TBL, TOKEN_ID_LOOKUP_IOT, etc.). If the trigger experiences an error, the trigger may raise an exception that forces the process to abend so that the failure can be investigated.

In some non-limiting embodiments, the data replication engine (e.g., implemented by transaction service provider system 108, etc.) may, in response to determining that the error record is a latest record of the error record and the main record, update one or more other database tables that are dependent on the database table with the error record Although discussed primarily with respect to a unique key identifier associated with a PAN, non-limiting embodiments or aspects are not limited thereto, and a merchant may tokenize at a payment instrument level or a customer level. In such a scenario, if the Identifier Token record fails to replicate, the payment instrument record also fails to replicate. The payment instrument record may have a foreign key dependency on the Identifier Token record and, therefore, the payment instrument record may not exist without the Identifier Token record existing, which causes the data replication engine to also fail to write the payment instrument. Even with handling the Identifier Token record as described herein above, payment instrument record that is trying to point to the older Identifier Token record would still exist. In particular, the data replication engine may try to replicate the Identifier Token "iden1", which may fail due to the unique key violation. The data replication engine may apply the process 300 described herein above to determine that "iden1" is a duplicate of "iden2", and that "ident2" is the latest record and, therefore, that "iden1" should be discarded. The data replication engine, within the same transaction (because the Identifier Token and Payment Instrument are created within the same COMMIT same operation, attempts to replicate the payment instrument "inst1" for "iden1". However, this replication fails because "iden1" does not exist in that database, because "iden2" is the latest record. This would typically cause Oracle GoldenGate to fail due to a foreign key violation. However, the data replication engine may implement the same logic as described herein with respect to process 300 for the payment instrument. If the replication fails due to a foreign key failure, the data replication engine may flush the record into a payment instrument error table, where a trigger executes in response thereto and maps the payment instrument to the correct Identifier Token record (e.g., in this example "inst1" "iden2").

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method for identifying and resolving constraint violations in a data replication process in a database replication system, the database replication system including a source database and a target database, each database having one or more tables, comprising:
    detecting a database change that causes a constraint violation as a result of a target database table having one or more constraints;
    determining whether a type of the constraint violation is a predetermined type of constraint violation;
    in response to determining that the type of the constraint violation is the predetermined type of constraint violation, writing the database change to an error table;
    in response to writing the database change to the error table, automatically and immediately writing the database change to a master replication errors table as an error record and determining whether the predetermined type of constraint violation is associated with a predetermined type of unique identifier;
    in response to determining that the predetermined type of constraint violation is associated with the predetermined type of unique identifier, locking a main record associated with the predetermined type of constraint violation in the target database table and comparing the error record to the main record in the target database table to determine whether the error record is a latest record of the error record and the main record;
    in response to determining that the error record is the latest record of the error record and the main record, updating the target database table with the error record; and
    in response to determining that the error record is not the latest record of the error record and the main record, abending the data replication process.

2. The computer-implemented method of claim 1, wherein the predetermined type of constraint violation includes a unique key violation.

3. The computer-implemented method of claim 1, wherein the predetermined type of unique identifier includes an account identifier.

4. The computer-implemented method of claim 3, wherein the account identifier includes a primary account number (PAN).

5. The computer-implemented method of claim 1, wherein the predetermined type of unique identifier includes at least one of a unique payment instrument identifier and a unique customer identifier.

6. The computer-implemented method of claim 1, further comprising:
    in response to determining that the error record is the latest record, updating one or more other database tables that are dependent on the target database table with the error record.

7. The computer-implemented method of claim 1, further comprising:
    replicating changes made at the source database to the target database by immediately applying the changes to the target database that do not cause a constraint violation.

8. A database replication system for identifying and resolving constraint violations in a data replication process, comprising:
    a source database and a target database, each database having one or more tables; and
    one or more processors programmed and/or configured to:
        detect a database change that causes a constraint violation as a result of a target database table having one or more constraints;
        determine whether a type of the constraint violation is a predetermined type of constraint violation;
        in response to determining that the type of the constraint violation is the predetermined type of constraint violation, write the database change to an error table;
        in response to writing the database change to the error table, automatically and immediately write the database change to a master replication errors table as an error record and determine whether the predetermined type of constraint violation is associated with a predetermined type of unique identifier;
        in response to determining that the predetermined type of constraint violation is associated with the predetermined type of unique identifier, lock a main record associated with the predetermined type of constraint violation in the target database and compare the error record to the main record in the target database table to determine whether the error record is a latest record of the error record and the main record;

in response to determining that the error record is the latest record of the error record and the main record, update the target database table with the error record; and in response to determining that the error record is not the latest record of the error record and the main record, abend the data replication process.

9. The database replication system of claim 8, wherein the predetermined type of constraint violation includes a unique key violation.

10. The database replication system of claim 8, wherein the predetermined type of unique identifier includes an account identifier.

11. The database replication system of claim 10, wherein the account identifier includes a primary account number (PAN).

12. The database replication system of claim 8, wherein the predetermined type of unique identifier includes at least one of a unique payment instrument identifier and a unique customer identifier.

13. The database replication system of claim 8, wherein the one or more processors are further programmed and/or configured to:

in response to determining that the error record is the latest record, update one or more other database tables that are dependent on the target database table with the error record.

14. The database replication system of claim 8, wherein the one or more processors are further programmed and/or configured to:

replicate changes made at the source database to the target database by immediately applying the changes to the target database that do not cause a constraint violation.

15. A computer program product for identifying and resolving constraint violations in a data replication process in a database replication system, the database replication system including a source database and a target database, each database having one or more tables, the computer program product comprising at least one non-transitory computer-readable medium including program instructions that, when executed by at least one processor, cause the at least one processor to:

detect a database change that causes a constraint violation as a result of a target database table having one or more constraints;

determine whether a type of the constraint violation is a predetermined type of constraint violation;

in response to determining that the type of the constraint violation is the predetermined type of constraint violation, write the database change to an error table;

in response to writing the database change to the error table, automatically and immediately write the database change to a master replication errors table as an error record and determine whether the predetermined type of constraint violation is associated with a predetermined type of unique identifier;

in response to determining that the predetermined type of constraint violation is associated with the predetermined type of unique identifier, lock a main record associated with the predetermined type of constraint violation in the target database table and compare the error record to the main record in the target database table to determine whether the error record is a latest record of the error record and the main record;

in response to determining that the error record is the latest record of the error record and the main record, update the target database table with the error record; and in response to determining that the error record is not the latest record of the error record and the main record, abend the data replication process.

16. The computer program product of claim 15, wherein the predetermined type of constraint violation includes a unique key violation.

17. The computer program product of claim 15, wherein the predetermined type of unique identifier includes an account identifier.

18. The computer program product of claim 17, wherein the account identifier includes a primary account number (PAN).

19. The computer program product of claim 15, wherein the at least one processor is further programmed and/or configured to:

in response to determining that the error record is the latest record, update one or more other database tables that are dependent on the target database table with the error record.

20. The computer program product of claim 15, wherein the at least one processor is further programmed and/or configured to:

replicate changes made at the source database to the target database by immediately applying the changes to the target database that do not cause a constraint violation.

* * * * *